US006728771B2

(12) United States Patent
Stumer

(10) Patent No.: US 6,728,771 B2
(45) **Date of Patent: *Apr. 27, 2004**

(54) GENERIC TRANSPORT OPTION FOR TRANSPORTING MESSAGES IN RELAY OR BROADCAST MODE VIA COMBINATIONS OF ISDN B-CHANNELS OR D-CHANNELS

(75) Inventor: Peggy M. Stumer, Boca Raton, FL (US)

(73) Assignee: Siemens Information and Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 18 days.

(21) Appl. No.: 09/045,265

(22) Filed: Mar. 20, 1998

(65) Prior Publication Data

US 2002/0035630 A1 Mar. 21, 2002

(51) Int. Cl.[7] .............................................. G06F 15/173

(52) U.S. Cl. ....................................... 709/227; 370/432

(58) Field of Search ................................ 709/227, 249; 370/412, 392, 463, 464, 466, 524, 465, 468, 471, 352, 432, 462, 264, 265

(56) References Cited

U.S. PATENT DOCUMENTS 4,486,852 A * 12/1984 Champlin et al. .......... 713/400
4,896,319 A * 1/1990 Lidinsky et al. .............. 370/60
5,138,613 A * 8/1992 Kudoh ....................... 370/390
5,341,374 A * 8/1994 Lewen et al. ............... 370/450
5,400,325 A 3/1995 Chatwani et al. .......... 370/60.1
5,463,623 A * 10/1995 Grimes et al. ................ 370/79
5,479,407 A * 12/1995 Ko et al. .................... 370/231
5,557,798 A * 9/1996 Skeen et al. .................. 705/35
5,572,678 A * 11/1996 Homma et al. ............. 709/227
5,594,732 A * 1/1997 Bell et al. .................... 370/401
5,615,213 A * 3/1997 Griefer ........................ 370/412
5,694,394 A * 12/1997 Shinohara ................... 370/392
5,708,781 A * 1/1998 Chiashi et al. .............. 370/313
5,805,597 A * 9/1998 Edem ......................... 370/445

(List continued on next page.)

FOREIGN PATENT DOCUMENTS

WO WO 98/51053 11/1998

OTHER PUBLICATIONS

Internetworking with TCP/IP on Windows NT 4.0, Microsoft Press, pp 2, 3, 42, 43, 64, 82, 83, 112, 113, 187, 188, 210–213, 261, 262, 327, 328, 1997.*

Internetworking with TCP/IP on Windows NT 4.0, Microsoft Press, pp. 2, 3, 42, 64, 82, 83, 112, 113, 187, 188, 210–213, 261, 262, 327, and 328, 1997.*

"Generalized Request/Reply Mechanism for Use in Asynchronous Distributed Environments" IBM Technical Disclosure Bulletin, IBM Corp., vol. 29, No. 8, 1987, pp. 3345–3357.

*Primary Examiner*—Zarni Maung
*Assistant Examiner*—William C. Vaughn, Jr.

(57) ABSTRACT

Generic transport option invoked by a system administrator module (104) which defines what data type to send, the destination to which the data should be sent, the dissemination method, the mode of transport, the schedule, and which transport facility to be used. When the generic transport option has been invoked, the server (102) acknowledges the control command and proceeds to set up the appropriate connection (101), prepares a predetermined portion of a data container (400) with control header information (402), retrieves the proper data, and packs the data into the transport container (404). Further, confirmation is provided for each container sent that the message was received successfully.

25 Claims, 9 Drawing Sheets

2000
Receive Invoke Command 2002
ACK? 2004
Read data type 2006
Active? 2008
Cancel previous 2010
Transfer to Send Module 2012

Receive Invoke Command 2020
ACK? 2024
Read control information 2022
Retrieve application data 2026
Pack header 2028
Pack container 2030
Send 2032

U.S. PATENT DOCUMENTS 5,867,716 A * 2/1999 Morimoto et al. .......... 713/310
5,884,322 A * 3/1999 Sidhu et al. ................ 707/200
5,887,172 A * 3/1999 Vasudevan et al. ......... 709/328
5,892,819 A * 4/1999 Stumer ....................... 370/259
5,905,890 A * 5/1999 Seaman et al. ................ 714/4
5,911,066 A * 6/1999 Williams et al. ............ 709/310
5,930,512 A * 7/1999 Boden et al. ................. 717/10
5,954,794 A * 9/1999 Fishler et al. ............... 709/213
5,982,769 A * 11/1999 Bond et al. ................. 370/357
5,987,608 A * 11/1999 Roskind ..................... 713/200
5,999,986 A * 12/1999 McCauley III et al. ..... 709/300
6,014,710 A * 1/2000 Talluri et al. ............... 709/237
6,016,319 A * 1/2000 Kshirsagar et al. ......... 370/410
6,041,344 A * 3/2000 Bodamer et al. ........... 709/203
6,044,224 A * 3/2000 Radia et al. .................. 717/10
6,064,653 A * 5/2000 Farris ......................... 370/237
6,065,017 A * 5/2000 Barker ....................... 707/202
6,067,567 A * 5/2000 Bartfai et al. ............... 709/221
6,085,030 A * 7/2000 Whitehead et al. ......... 709/203
6,085,035 A * 7/2000 Ungar ........................... 717/5
6,091,737 A * 7/2000 Hong et al. ................. 370/431
6,101,527 A * 8/2000 Lejeune et al. ............. 709/201
6,108,330 A * 8/2000 Bhatia et al. ............... 370/352
6,122,277 A * 9/2000 Garmire et al. ............. 370/390
6,141,338 A * 10/2000 Tadamura et al. .......... 370/352
6,157,649 A * 12/2000 Peirce et al. ................ 370/401
6,182,146 B1 * 1/2001 Graham-Cumming, Jr. . 370/389
6,222,837 B1 * 4/2001 Ahuja et al. ................ 370/352
6,233,248 B1 * 5/2001 Sautter et al. .............. 370/465
6,272,135 B1 * 8/2001 Nakatsugawa .............. 370/390
6,292,478 B1 * 9/2001 Farris ......................... 370/352

* cited by examiner 100
102a
Server
104a
103a
106a
RS232
Terminal
Equipment
Processor
Microprocessor
Control Module
Interface
uP
112a
uPT
122a
124a
114a
UART
116a
Interface
120a
121a
126a
Control
Module
Interface
123a
128a
119
Memory
130a
108a
Memory
117
118a
132a
110a
Disk Drive
101
102b
104b
103a
106b
RS232
Terminal
Equipment
Processor
Microprocessor
Control Module
Interface
uP
112b
uPT
122b
124b
114b
UART
116b
Interface
120b
126b
Control
Module
Interface
123b
128b
119
Memory
130b
108b
Memory
121
118b
132b
110b
Disk Drive

GENERIC TRANSPORT OPTION FOR TRANSPORTING MESSAGES IN RELAY OR BROADCAST MODE VIA COMBINATIONS OF ISDN B-CHANNELS OR D-CHANNELS

BACKGROUND OF THE INVENTION

1. Field of the Invention

The present invention relates to communication systems and, more particularly, to an ISDN (Integrated Services Digital Network) communication system.

2. Description of the Related Art

Program controlled switching equipment for Servers connects communication terminal equipment to one another and to communications networks. Such systems typically require a system administration module, typically implemented in software, associated with each Server in order to handle administrative and control functions such as supervising Server call detail recording (CDR), moves, adds and changes (MAC), automated call detail statistics (ACD), and other types of data.

When only one Server exists in the network, it is a relatively simple matter to manage reassignment of communication lines, for example, and update Server applications. Increasingly, however, communications facilities such as private ISDN (Integrated Services Digital Networks) networks linking multiple sites exist, requiring a plurality of Servers to adequately handle the communication needs of the customer (e.g., a company may maintain a single intranet at multiple locations). Typically, data for each Server is stored locally with the particular Server and it can only be ported to a centralized location or to other Servers via remote access (i.e., external to the network) through the public switched telephone network (PSTN) or via manually transporting a diskette or magnetic tape.

Accordingly, there is a need for a system for globally administering data among a plurality of Servers in a network. There is a still further need for a system for making data available network-wide. There is a yet further need to provide a method for transporting data among a plurality of Servers with low overhead processing and confirmation of receipt.

SUMMARY OF THE INVENTION

These and other drawbacks in the prior art are overcome in large part by a generic transfer option according to the present invention. More particularly, the present invention provides a generic transport option whereby data may be made available via the network to any of a plurality of servers within the network. The data may be transported in either a broadcast or relay fashion on either ISDN B-channels or D-channels or a combination thereof.

According to one embodiment, the generic transport option is invoked by a system administrator module which defines what data type to send, the destination to which the data should be sent, the dissemination method, the mode of transport, the schedule, and which transport facility to be used. When the generic transport option has been invoked, the server acknowledges the control command and proceeds to set up the appropriate connection, prepares a predetermined portion of a data container with control header information, retrieves the proper data, and packs the data into the transport container. Further, confirmation is provided for each container sent that the message was received successfully.

BRIEF DESCRIPTION OF THE DRAWINGS

A better understanding of the present invention is attained when the following detailed description is considered in conjunction with the following drawings in which.

DETAILED DESCRIPTION OF THE INVENTION

Figure 1:
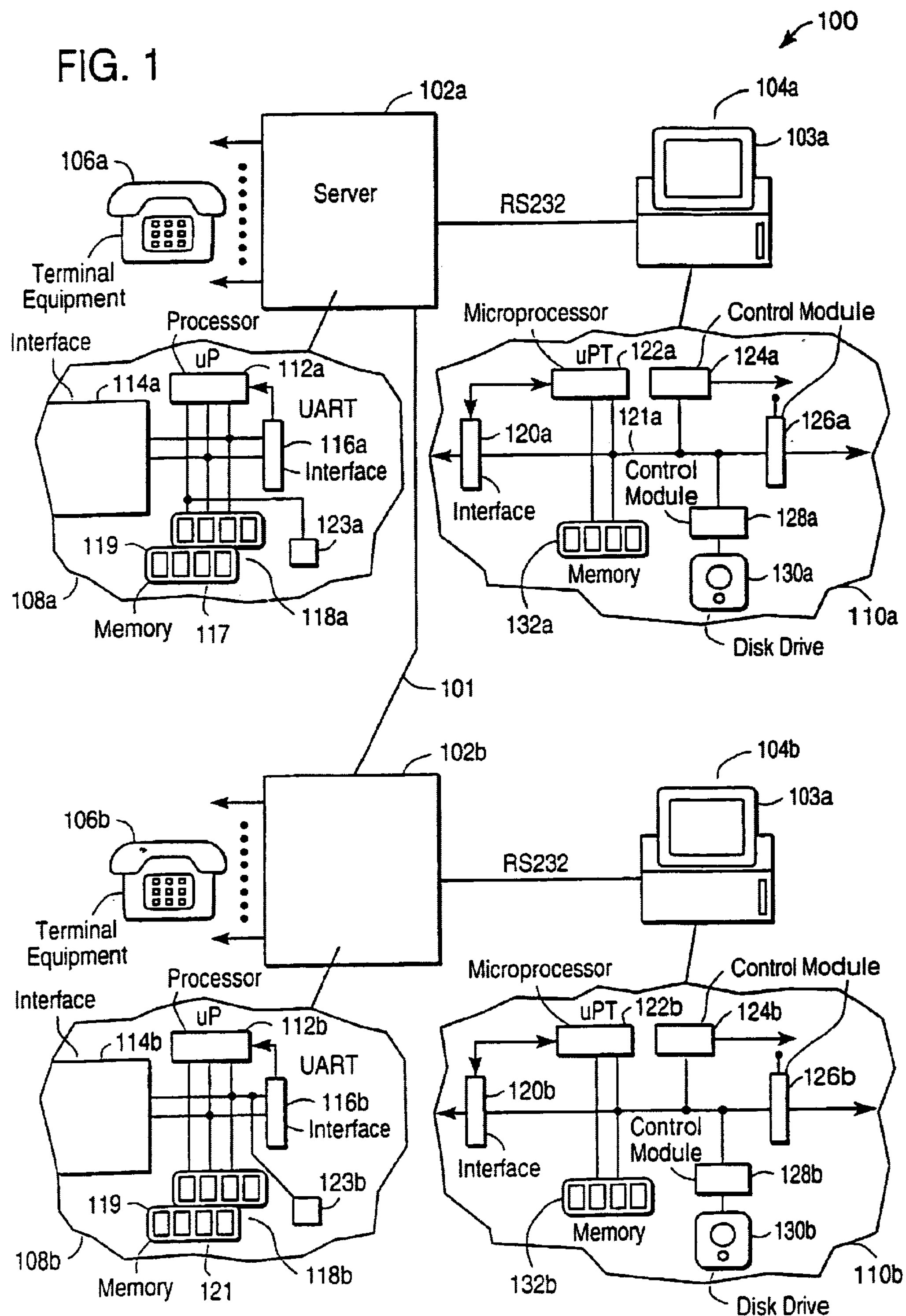
FIG. 1 is a block diagram showing communication servers and system administrator modules according to an embodiment of the present invention.

Referring to the drawings, and especially to FIG. 1, a communication system embodying the present invention is shown therein and generally identified by reference numeral 100. It is noted that, while described herein generally as a confirmed service, the generic transport option may be implemented as a one-way "datagram" which does not need delivery confirmation. In addition, the generic transport option may be used to transport other services such as fax and video. The communication system 100 includes a server 102*a* servicing terminal equipment 106*a*. A second server 102*b* servicing terminal equipment 106*b* is linked to the server 102*a* by way of a line 101, such as an ISDN (Integrated Services Digital Network) line. Each server 102*a*, 102*b* may have associated with it a system administration terminal 104*a*, 104*b*, respectively. The system administration terminals 104*a*, 104*b* may be connected to the servers 102*a*, 102*b*, respectively, by any known serial or parallel interfaces, including RS-232 interfaces or Universal Serial Bus interfaces, by which the administration and maintenance orders can be transmitted from the system administration terminals 104*a*, 104*b* to the servers 102*a*, 102*b*, respectively. It is noted that, while illustrated with a plurality of administration terminals 104*a*, 104*b*, in the typical case, only one is provided. It is further noted that, while two servers are shown, the system is not so limited. Thus, FIG. 1 is exemplary only.

Only the server 102*a* and the system administration terminal 104*a* is described, since similar functions are performed at the server 102*b* and the system at administration terminal 104*b*. The server 102*a* includes a known control system 108*a*. The control system 108*a* includes an interface 114*a* for interfacing the server 102*a* with the terminal equipment 106*a*. The control system 108*a* further includes a microprocessor 112*a* coupled to the interface 114*a*, memory 118*a* and interface 116*a*. The interface 116*a* interfaces the server 102*a* with the system administration terminal 104*a*. Thus, for example, the interface 116*a* may be an RS-232 interface. When data are received at the interface 116*a*, for example, by way of a universal asynchronous receiver/transmitter, an interrupt may be generated at the microprocessor 112*a*. The microprocessor 112*a*, in response, reads the received data from the interface 116*a*. The data may further be stored in the memory 118*a*, as will be explained in greater detail below. It is noted that, while the data from the system administration terminal 104 may be new data, it may also be a command to transfer already stored data, as will be described in greater detail below. Finally, an ISDN interface 123 may be provided for communication with other servers, for example.

The system administration terminal 104*a* may include a monitor 103*a* and a computer 110*a*. The computer 110*a* may be a PC compatible or Macintosh-type computer. The computer 110*a* thus includes a microprocessor 122*a* coupled to a bus 121*a*. Further coupled to the bus 121*a* is an interface 120*a* which provides, for example, an RS-232 interface to the server 102*a*. A memory 132*a* is further coupled to the microprocessor 122*a*. Various peripheral or I/O devices may be coupled to the bus 121*a* via Control Modules 124*a*, 126*a*, respectively. Additionally, a disk drive 130*a* may be coupled to the bus 121*a* via a Control Module 128*a*. The disk drive 130*a* is representative of, for example, a hard or floppy disk drive. The microprocessor 122*a* may be any suitable processor, such as any X86-type processor, such as a Pentium, Pentium Pro or Pentium II-type processor; or a Power PC processor. The bus 121*a* may be a PCI (Peripheral Component Interconnect) interface bus or an Industry Standard Architecture (ISA) bus.

As will be described in greater detail below, a system administrator may input, for example, moves, adds and changes into the system administration terminal 104*a* either by keyboard input or other media source such as a floppy disk inserted into disk drive 130*a*. Alternatively, updates may be programmed to occur automatically. Moreover, the generic transport option may be implemented to support known data sorting, reformatting, encryption/decryption and companding on a trunk, trunk group or span basis. The microprocessor 122*a* reads the data from the disk drive or the keyboard input and transports it via the interface 120*a* across the RS-232 serial link to the interface 116*a* of the server 102*a*. The interface 116*a* generates an interrupt at the processor 112*a* which, in turn, reads the data from the interface 116*a*. The processor 112*a* may then store the data in the memory 118*a*, or execute a function in response thereto.

Figure 3A:
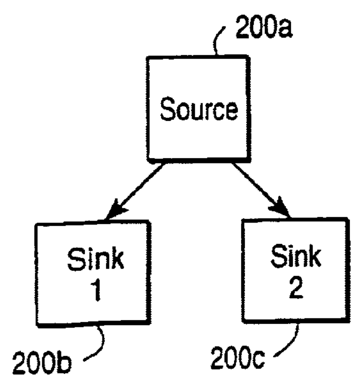
FIGS. 3A–3C are diagrams illustrating modes of transport used according to an embodiment of the present invention.
Figure 3B:
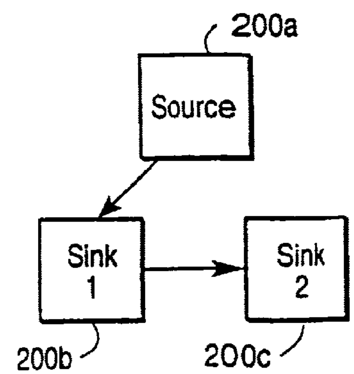
Figure 3C:
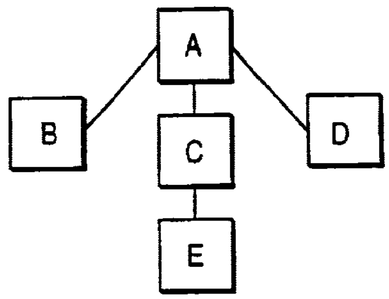

According to the present invention, data are transferred by the server 102*a*, i.e., by the processor 112*a*, to the ISDN interface 123*a* and across the ISDN link 101*a* to the server 102*b*. The server 102*b*'s processor 112*b*, in turn, reads the data from its ISDN interface 112*b*, provides it to the appropriate application, and updates its programs accordingly. According to one embodiment, the data can be transported to other servers either by a relay or broadcast mode (FIG. 3). More particularly, in FIG. 3A, a source server 200*a* transmits the same information to each sink server 200*b* and 200*c*. (The server which is conducting the initial transmission is referred to as the "source." The receiving servers are referred to as "sinks."). In FIG. 3B, the source server 200*a* transmits the data to the sink server 200*b*. The sink server 200*b*, in turn, transmits the data to the sink server 200*c*. Selection of broadcast or relay modes is made by the system administrator, typically based on network topology, so as to minimize trunk facilities, cost, or generally optimize client network requirements. Relay or broadcast mode is not intended to circumvent a server's routing mechanism. The modes are provided as a means of control on what server performs the actual dissemination.

For example, when Server A (FIG. 3C) is the source and is sending data to sink B, C, D and E where direct links exist to B, C, and D, but to send data to E requires tandeming through C, data transmission is decreased by sending the data to E by relay mode to C. Data transmission is saved by sending once to C who sends the same data to E via one less connection. Another example is when E is unknown to the source A, because it may be a passive standby server used for redundancy but is not considered active as a network entity.

Figure 2:
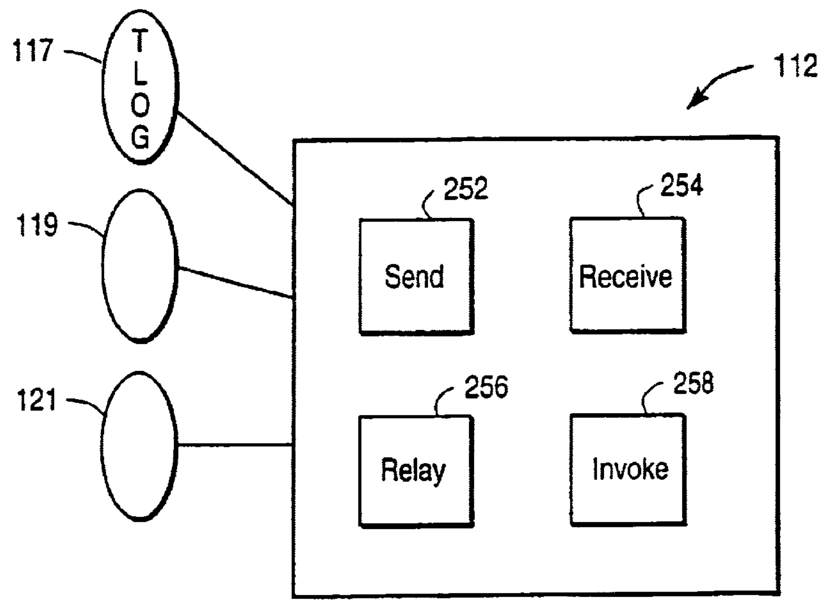
FIG. 2 is a block diagram of a system processor according to an embodiment of the invention.

According to the present invention, each server 102, and particularly, each processor 112, as shown in FIG. 2, may be provided with a Send Module 252, a Receive Module 254, a Relay Module 256 and an Invoke Module 258. More particularly, software corresponding to each functional module is stored in the memory 118 and executed by the processor(s) 112. The memory 118 coupled to the processor 112 may further be used to store a run-time transmission log 117, and source 119 and/or sink repositories 121 where data is stored.

The Invoke Module 258 is responsible for instructing selected server(s) in the network to send the data to one or more addresses in the network. As discussed above, an Invoke operation may be invoked by the network administrator via the system administration terminal 104 and remains in effect until cancelled or another invocation is requested for that data type. (While a common data format is not required, data may be assigned a unique data type value, known by the system administrator and identified locally in the source and sink repository header information). Generally, only one Invoke Module 258 will exist in a particular network, since it is a global controlling entity which dictates network changes. As will be discussed in greater detail below, Invoke requests are confirmed by the network server which receives the requests. Confirmation includes, for example, the server 112*b* returning a command via the ISDN link 101 to the server 112*a*. It is noted that the Invoke Module 258 need not be located at the same site as the system administration terminal 104.

Figures 8A, 8B:
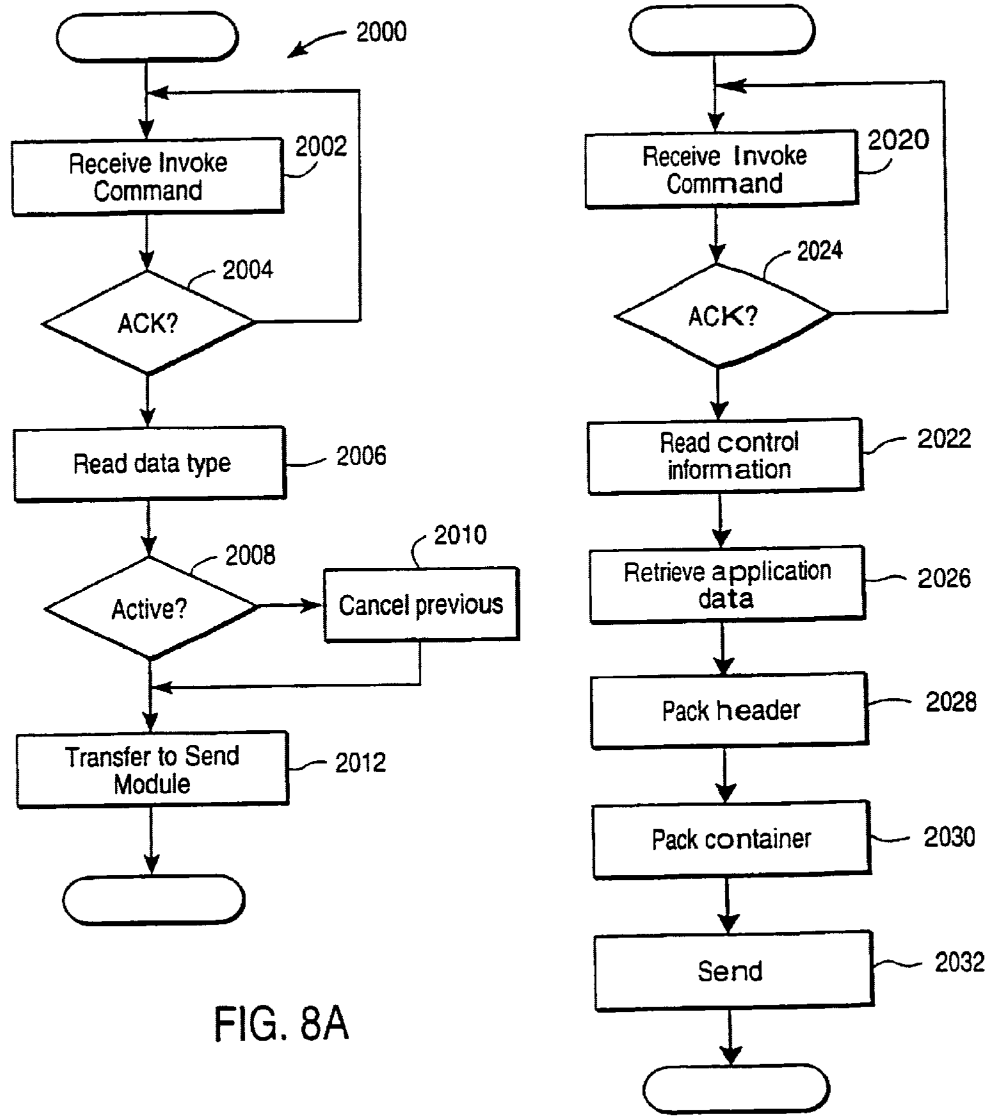
FIGS. 8A–D are flowcharts illustrating operation of modules according to an embodiment of the present invention.

For example, a flowchart 2000 illustrating operation of an exemplary Invoke Module is illustrated in FIG. 8A. In a step 2002, the Invoke Module 258 receives the Invoke command from the system administration terminal 104. This includes, as discussed above, the processor 112 receiving the command via the UART interface 116 in response to an interrupt command. The Send Module 252 then sends a confirmation to the system administration terminal 104 in a step 2004. This includes, for example, the processor 112 sending a command to the UART 112 which, in turn, transports the command across the RS-232 interface, which is received at the interface 120 of the system administration terminal 104 and processed by the microprocessor 122. The confirmation command itself may include a duplicate of all or part of the control information required for establishing the connection. If confirmation is not received at the system administration terminal 104, the system administration terminal will retransmit the Invoke command. In a step 2006, the Invoke Module 258 will read the data type from the Invoke command. In a step 2008, the Invoke Module 258 will determine if the transport option is already active for that data type. If so, then the Invoke Module 258 will terminate the previous invocation of the protocol in a step 2010. In a step 2012, the Invoke Module 258 will transfer the command to the Send Module 252.

Figure 4:
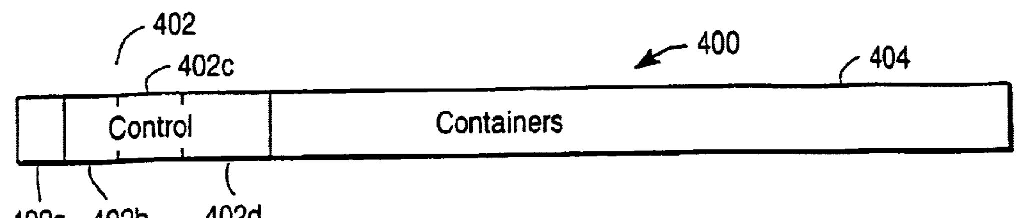
FIG. 4 is a diagram showing data containers according to an embodiment of the present invention.

The Send Module or program 252 is responsive to receiving the Invoke command from the Invoke Module 258, storing the instructions, and confirming the receipt of the Invoke command. As discussed above, according to the present invention, data are transmitted as data containers (FIG. 4). The application raw data is put into the containers and transported "as is." Thus, existing data formats are transported, without the need for a common data format. As will be discussed in greater detail below, application data records may be delimited via 8th bit flags for 7-bit or less code sets. Each container 400 includes up to 131 octets or bytes of information. The first four bytes or octets may be used as the control header 402. The control header 402 is prepared by the Send Module 252, based on an Invoke request. The control header 402 identifies the mode of operation, destination sinks, and other relevant information. For example, the first byte 402*a* may identify the data type; the second byte 402*b* may identify the destination; the third byte 402*c* may identify whether transport is in relay or broadcast modes; and the fourth byte 402*d* may identify a second destination in relay mode. In addition, the control header 402 contains origination information for the destination to read and send confirmations back upon receipt. The data container 404 may be up to 127 octets or bytes long. Data are packed into the containers as they are received from the application, i.e., without their format being changed. The Send Module 252 retrieves the data identified by the Invoke command and packs the data in the data containers 404, starting with the oldest stored data. Each message that the Send Module 252 transports is sent as close as possible to the maximum container length, including one or many packets or records of data. An application packet is typically not split between two containers, nor are data types typically mixed within containers, to avoid complexity. A transport session (i.e., signalling connection) may contain different data types in different messages. The Send Module 252 transports the requested data types to the designated addresses in either the Relay or the Broadcast modes. Each Send message is confirmed upon receipt or resent upon expiration of a timer located at the source node. The confirmation may be received with other Send message acknowledges in one message, each identified by a unique container identification. A timer is started upon sending and, on expiration, any non-acknowledged messages are resent.

Turning now to FIG. 8B, a flowchart illustrating operation of the Send Module 252 is shown. In particular, in a step 2020, the Send Module 252 receives the Invoke command information from the Invoke Module 258. The Send Module 252 may acknowledge receipt of the Invoke command from the Invoke Module 258 in a step 2024. In a step 2022, the Send Module 252 will read the control information. As discussed above, the control information includes the type and location of data to be transported, and similar information. The Send Module 252 may store the information in memory 118. In a step 2026, the Send Module 252 retrieves the data from the appropriate source repository. This includes, for example, accessing the memory 118 at the appropriately identified memory address. In a step 2028, the Send Module 252 will pack the transport header with the control information it previously stored. In a step 2030, the Send Module 252 will pack one or more containers with the data which are to be transported. Finally, in a step 2032, the Send Module 252 will send the data via the ISDN interface to the destination identified by the control information, and in the mode similarly identified.

The Receive Module 254 at the destination addresses receives the control header 402 and data 404, stores it in the sink repository 121, and then acknowledges its receipt to the sender (immediately, or after N message receipts). The data received in each message does not need to be kept in order by the Receive Module 254 unless desired. Otherwise, the sequence of the data is a function of the application. The present invention guarantees delivery to the designated server's sink repository 121 and, if delivery fails, it will resent any lost or faulty data. With the datagram generic transport option, delivery is not guaranteed. When the Receive Module 254 receives the data, the control header 402 and data 404 are stored. The header 402 is stored in case of further routing (i.e., Relay). The remaining data 404 is sent to an application sink repository via an internal interface. The Receive Module 254 sends confirmation to the Send Module 252 that the message was received. If not, it will send a rejection notice and the message will be resent.

Figures 8C, 8D:
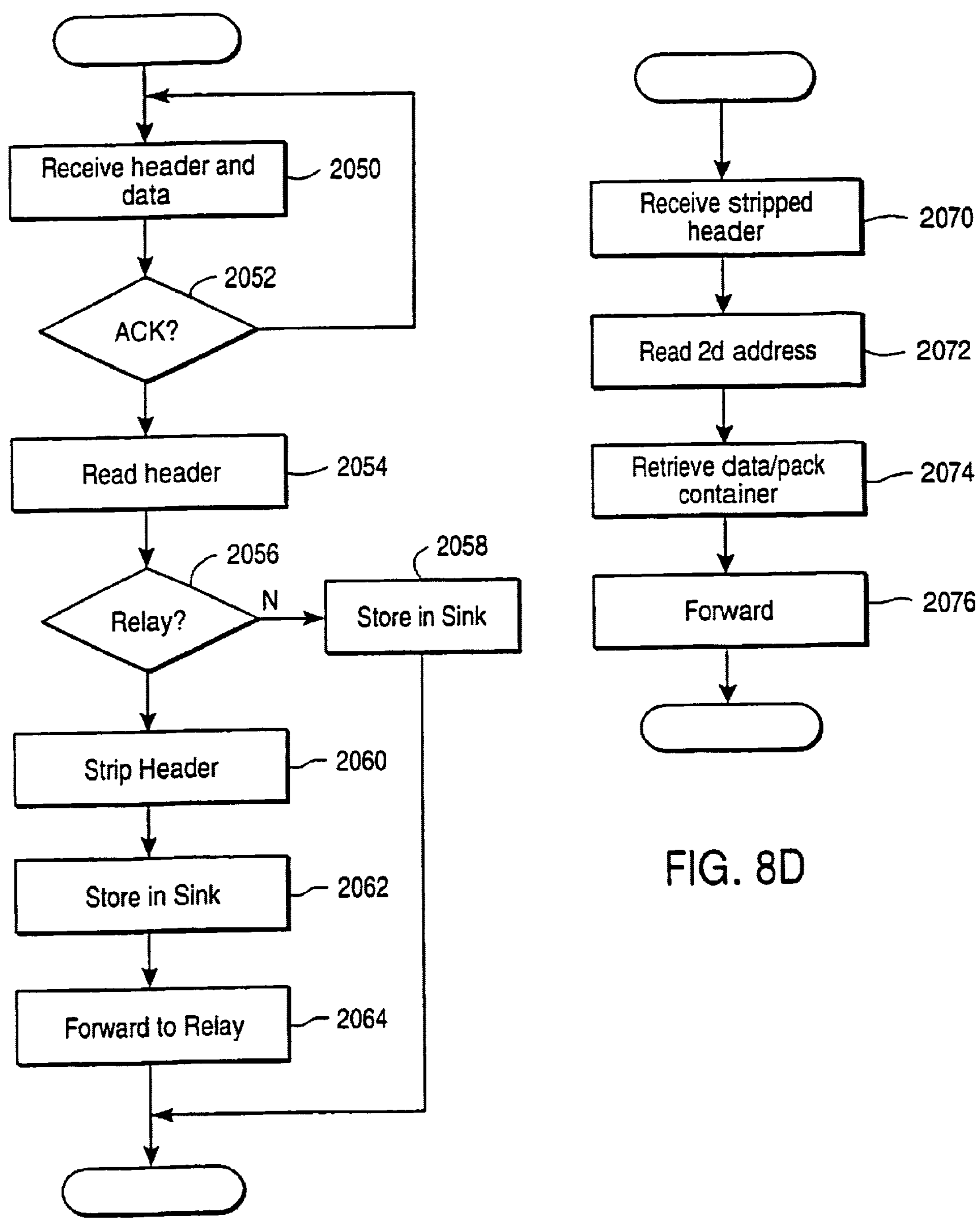

For example, a flowchart illustrating operation of an exemplary Receive Module 254 is shown in FIG. 8C. In particular, in a step 2050, the Receive Module 254 of the sink node will receive the generic transport protocol header and data containers. In a step 2052, the Receive Module 254 will return an acknowledgement to the Send Module 252 of the source node. If an acknowledgement is not received, the source node will re-send the data. In a step 2054, the Receive Module 254 will read the control header. In a step 2056, the Receive Module 254 will identify whether the data are being sent via relay or broadcast modes. For example, this information may be received as a predetermined byte sequence in the control header. If the data are not being transported in relay mode, the data will be stored in a sink repository in a step 2058. If, however, the data are being transported in relay mode, then in a step 2060, the Receive Module 254 will strip the control header of its destination information. More particularly, the control information identifying the Receive Module 254 of the current sink node is no longer necessary, so it is removed. The header may be re-packed as discussed above with regard to the Send Module 252. In a step 2062, the received data are stored or copied to a sink repository for use by the sink node. The data containers, with the new headers, are forwarded to the Relay Module 256 for continued transport in a step 2064.

The Relay Module 256 is coupled with the Receive Module 254 and provides relay dissemination when multiple destinations are assigned. The Relay Module 256 is similar to the Send Module 252. It becomes responsible for the data transmission further into the network. This may be applicable when the original Send Module 252 does not have routing knowledge beyond the server asked to perform the Relay function. Essentially, it takes the received control header and assumes the same function and responsibility as the Send Module 252 functionality. The Relay Module 256's primary usage is for data redundancy and fault tolerance, for example, in the case of a hot stand-by server adjacent to the primary or active server.

For example, operation of a Relay Module 256 is illustrated in FIG. 8D. In a step 2070, the Relay Module 256 receives the stripped header containing the new destination. In a step 2072, the Relay Module 256 reads the destination address. In a step 2074, the Relay Module 256 may retrieve the relay data from the sink repository and pack it into the data containers. Alternatively, it may simply receive the already packed data from the Receive Module 254 and forward the containers in a step 2076.

The Source Repository 119 is where the Send Module 252 retrieves the application to be transported. The Sink Repository 121 is the memory from which the receive entity stores the received data. Finally, application software with an interface to the application may be stored inboard or outboard the server. Such applications can include, but are not limited to, call detail records, administrative moves, adds and changes, ACD statistics and transmission log information.

As discussed above, the generic transport option according to the present invention is invoked by administrative commands, generally from the administrative terminal 104*a*, which indicates what data types to send, to whom to send, the dissemination method, the mode of transport, the schedule and which transport facility to use. The administrative command is received, for example, by the processor 112*a* of the server 102*a*. Once the processor 112*a* receives the administrative command, the processor 112*a* accesses the Invoke Module 256 to process the command. The Invoke Module 256 accesses the Send Module 252, stores the Invoke request information and sends an acknowledgement to the invoking entity. The processor Send Module 252 then activates its ISDN interface 123 and sets up the connection with the B or the D-channel responsive to the Invoke Module 256 and according to the Invoke command instructions. Depending on the command received from the invoking entity, i.e., the system administration terminal, the data may all be sent via the ISDN D-channel, or alternatively, the B-channel. The call control for the GTO connection is always sent via the D-channel, but the application data container 404 may be sent via either the B-channel or D-channel. In either case, as discussed above, the processor Send Module 252 prepares the first four octets with the control header 402, retrieves the proper data (generally from the source repository 119) starting with the oldest stored data, and packs the data into up to 127 octets of the container 404. Data are received into the containers as formatted in the application program. In addition, according to one embodiment, data types are not mixed within containers.

The server 102*b* may then receive the send container 400 via the interface 123*b*. The processor 112*b* activates its Receive Module 254. The processor 112*b*, in response to receiving the container 400, will then either store the received data in a sink repository 121 in the memory 118*b* or send it to an application interface (either internal or external), such as an RS-232 interface, at which point the data are utilized by the corresponding application. In addition, upon receipt of the container 400, the processor 112*b* transmits an acknowledgement of the receipt to the sender (The sender information has been included in the control header 402). One or many acknowledgements, which are identified by the unique message identifier, may be sent in a single return acknowledgement message. In one embodiment, confirmation is acknowledged on a per container basis, but multiple acknowledgements may be sent in one message.

If the received send message indicates a Relay command associated with the immediately following data, the Receive Module 254 of the processor 112*b* invokes the Relay Module 256. The Relay Module 256 reads the control header 402 to obtain the address to which the message is to be relayed. The Relay Module 256 takes the destination relay address out of the control header 402 prior to transmitting it. Once the relayed message has been sent to the next server in the chain, confirmation is sent by the recipient server. In effect, the Relay Module 256 acts as a secondary Send Module.

As noted above, either ISDN D-channel or B-channel signaling may be employed for sending GTO containers. The Invoke Command (and control header) will indicate whether B-channel or D-channel signaling is to be employed (in addition to call control BC/LLC). The transport facility may employ D-channel temporary signaling, such as short, long, semi-permanent or permanent connection. The D-channel may be used when the transport signaling traffic does not impair the flow of normal signaling connections, for example, at non-peak hours, evenings and weekends. The B-channel connection can be used when the traffic generated by the generic transport protocol would negatively impact the normal signaling on a D-channel. The B-channel is also desirable when the data is sent over public ISDN facilities or when tandem servers in the connection would not transparently transmit user information messages. A B-channel or bonded B-channels (greater than 64 kbps) may be used for very high volume data transport. It can be sent during high usage times, if available. The B-channel may be circuit switched, permanent or semi-permanent. The B-channel GTO transport incurs more overhead processing than D-channel facilities due to the set up establishment differences and is subject to more network checks and restrictions, such as network congestion. An Invoke request and Invoke request confirmation are always sent on the D-channel using a temporary signaling connection which is terminated upon confirmation.

In addition, the control header 402 may contain information indicating that channel modification is available (i.e., switching from a B-channel to a D-channel or vice-versa). In this case, as noted above, the transport facility type is determined by the network administrator and indicated in the Invoke command. Operation of the generic transfer option according to the invention is the same regardless of the underlying channel type. When the requested facility is a B-channel, the call control messages still are signaled on the D-channel. The Relay command also adheres to the originally requested transport facility type, which information is provided in the first control header.

A mode for data to be sent is designated by the network administrator. This may be in "batch," "real time," or "mixed" mode. In particular, the batch mode indicates to send only stored data, whereas real time mode indicates to send only those data which are occurring immediately. Mixed mode indicates to first send the stored data followed by any real time data as it occurs. When batch or mixed mode are requested, a schedule may also be administered. The schedule will specify time, day of week, day of year, etc., for sending the data at predetermined times. The generic transfer option is not responsible for the content of the transportation data or the order the data is sent or received in. Generally, if known, the oldest data are sent first (first in, first out). However, a message might get lost and be resent, resulting in the data being received in a different order, then first retrieved and sent. It is up to the receiving application to have it sequenced if required.

The batch request mode sends data according to the schedule indicated in the invoke request. The real time mode retrieves only the application records that are currently being written. This mode continues until another invoke request is received which can change the mode or disconnect real time mode. In mixed mode, both batch and real time are provided. The batch data is sent according to the schedule and real time records are sent immediately.

Figure 5:
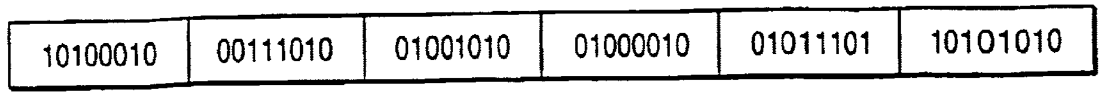
FIG. 5 is a diagram illustrating data encoding according to an embodiment of the invention.

Turning back to FIG. 2, the data format in the container 404 may be embodied in any 8-bit, 7-bit or fewer code set, for example, CCITT code sets 0 and 5 IA5 (ASCII). EBCDIC and Latin Alphabet No. 1 (ISO 8859-1) are true 8-bit code sets and are also supported by the generic transport option. The receiving application is responsible for interpretation of the data code set. For 7-bit or less code sets, data may optionally be transported with no parity. Instead, the 8-bit, i.e., most significant bit, may be used as the data record delimiter. For this option, the eighth bit of each octet for data record is initialized to 0. The first octet of a data record's eighth bit will be changed to 1, indicating the start of a data record. The last octet of this data record is changed to 1, thereby delimiting each data record in the substructure of the container. For example, turning to FIG. 5, a six octet record is shown. The first octet's eighth bit is set to 1; the next four octets eighth bits are set to 0; and the sixth octet's eighth bit is set to 1. A parity check at layer three is not necessary, since layer two has sufficient error checking. Demarcation of data records is provided to facilitate the application repository function, but may not be needed by the application.

Figure 6:
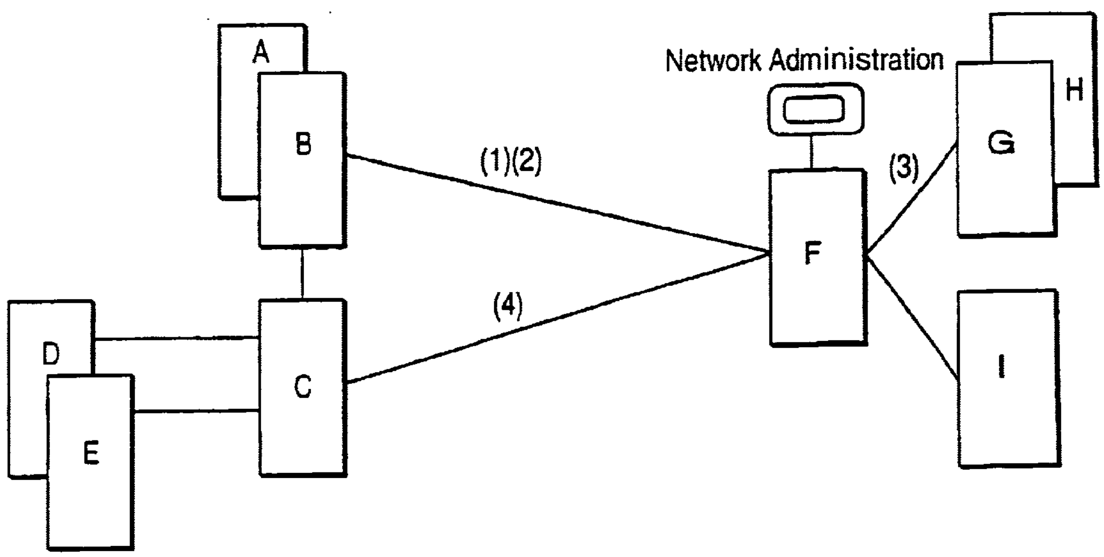
FIG. 6 is a diagram illustrating exemplary operation of an embodiment of the present invention.

Turning now to FIG. 6, a diagram of an exemplary network configuration and invocation set up is illustrated. The transport facility's network interface employs the ISDN layer 3 protocol. More particularly, a plurality of Servers A-I are provided. A network administrator module is coupled to the Server F. In the example shown in FIG. 6, the network administrator at Server F invokes the transfer protocol according to the present invention. The instructions are for Server B to send CDR data to Server A and for Server B to send MAC data to Server H, Servers G and E to send CDR data to Server A and B, and Server A to send CDR data to Server B. The selected facility is the D-channel for all data transport. The selected dissemination of transmission for data type CDR is relay. Broadcast is the dissemination default. Four separate invoke requests are necessary:

1. Server F sends invoke request to Server A:

Channel (D)

Address (of Server B)

Type of Data (CDR)

Mode (batch)

2. Server F sends invoke request to Server B:

Channel (D)

Address (of Server A)

Type of Data (CDR)

Mode (batch)

Address (of Server H)

Type of Data (MAC)

Mode (batch)

3. Server F sends invoke request to Server G:

Channel (D)

Address (of Server A)

Type of Data (CDR)

Mode (batch)

Address (of Server B)

Type of Data (CDR)

Mode (batch)

Dissemination (relay)

4. Server F sends invoke request to Server E:

Channel (D)

Address (of Server A)

Type of Data (CDR)

Mode (batch)

Address (of Server B)

Type of Data (CDR)

Mode (batch)

Dissemination (relay)

Normally, Server F will receive an acknowledgement of the invoke command. If it receives a reject instead, or a timer expiration, it shall resend an invoke request. If this again fails, a record may be optionally written to the TLOG 117 recording the date, time stamp, called party number and protocol discriminator. The TLOG 117, or transmission log provides an audit trail.

Figure 7A:
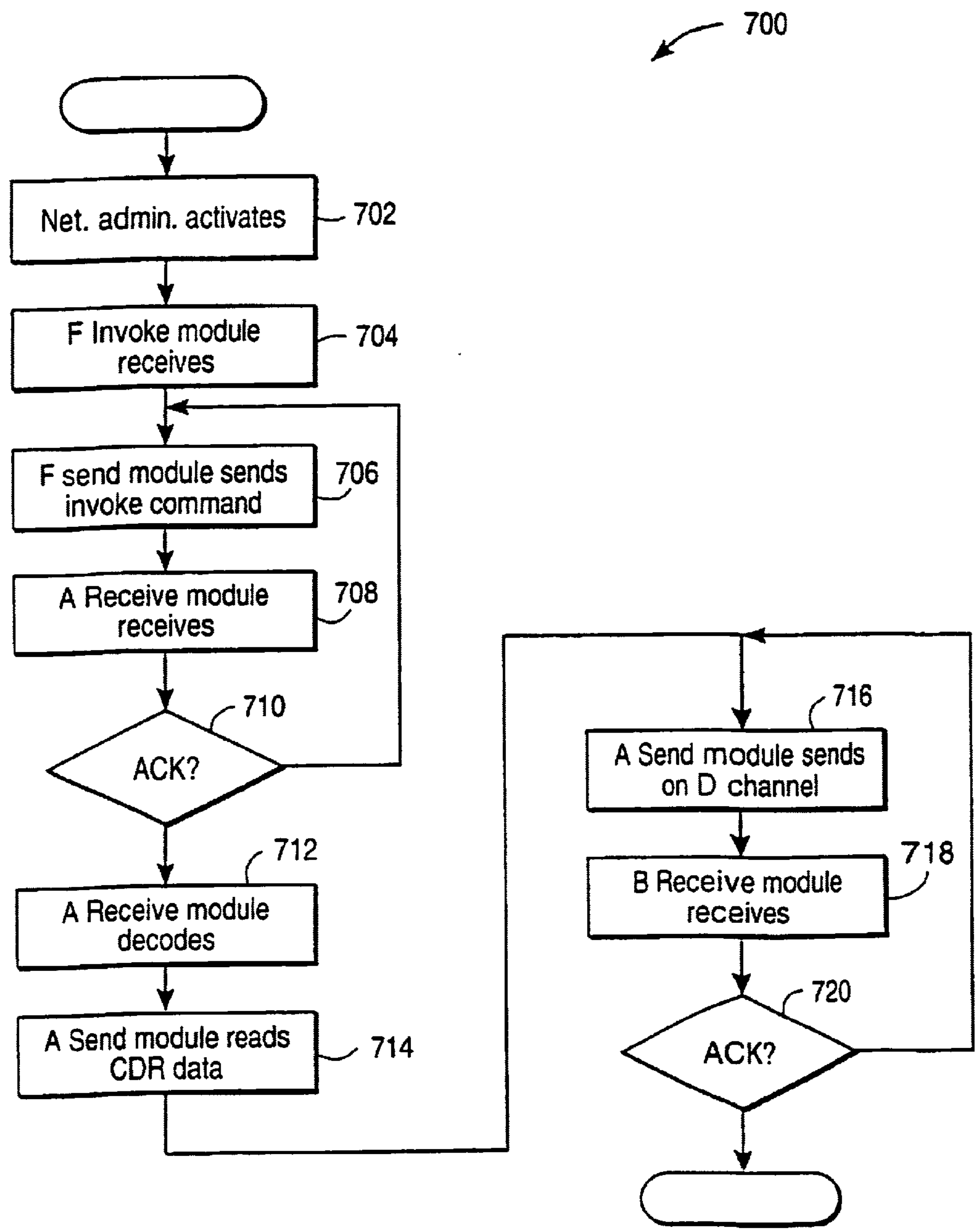
FIGS. 7A–D are diagrams illustrating exemplary invocation requests according to an embodiment of the present invention.

Turning now to FIGS. 7A–7D, flowcharts illustrating call signalling for the network configuration of FIG. 6 is illustrated. In particular, FIG. 7A illustrates signalling for request (1). In step 702, the network administrator activates the generic transport option. As discussed above, activation of the generic transport option may include the network terminal 104*a* transmitting a command via the RS-232 link to the Server 102*a*. In a step 704, the Server F Invoke Module receives the activation command from interface 116*a*. In particular, the interface 116*a* asserts an interrupt at the microprocessor 112*a*. The Invoke Module reads the incoming command. The Server F Invoke Module in step 706 formats the Invoke command and stores the instructions and sends the command thereto. The Server F stores the instructions and transmits the Invoke command to the Server A Receive Module, for example, by activating its ISDN interface.

The Server A Send Module in a step 708 receives the Invoke command via the ISDN D-channel from the Server F Invoke Module. As discussed above, the Invoke Command includes information concerning the destination Server, the application source, the signalling channel and protocol. In a step 710, the Server A Receive Module will return an acknowledgement signal to the Server F Invoke Module. If the acknowledge command from the Server A Send Module is not received by the Server F Invoke Module within a predetermined time, the Server F Invoke Module will resend the data to the Server A Send Module. If, however, in step 710, the acknowledge signal was received, then Server F Invoke process is completed, and the Server A Send Module will decode the received Invoke command from the Server F Invoke Module. As discussed above, in the example given, the Server A is to transmit CDR data to the Server B on D-channel in batch mode. In a step 714, the A Send Module will read the CDR data from its source repository. In a step 716, the Server A Send Module will send the CDR data to the Server B via the D channel in batch mode. In a step 718, the Server B Receive Module will receive the CDR data sent from Server A. The Server B Receive Module then stores the data in its sink repository for use with application software. In a step 720, an acknowledgement may be returned to the Server A. If an acknowledgement is not returned within a predetermined period, the Server A Send Module will resend the CDR data.

Figure 7B:
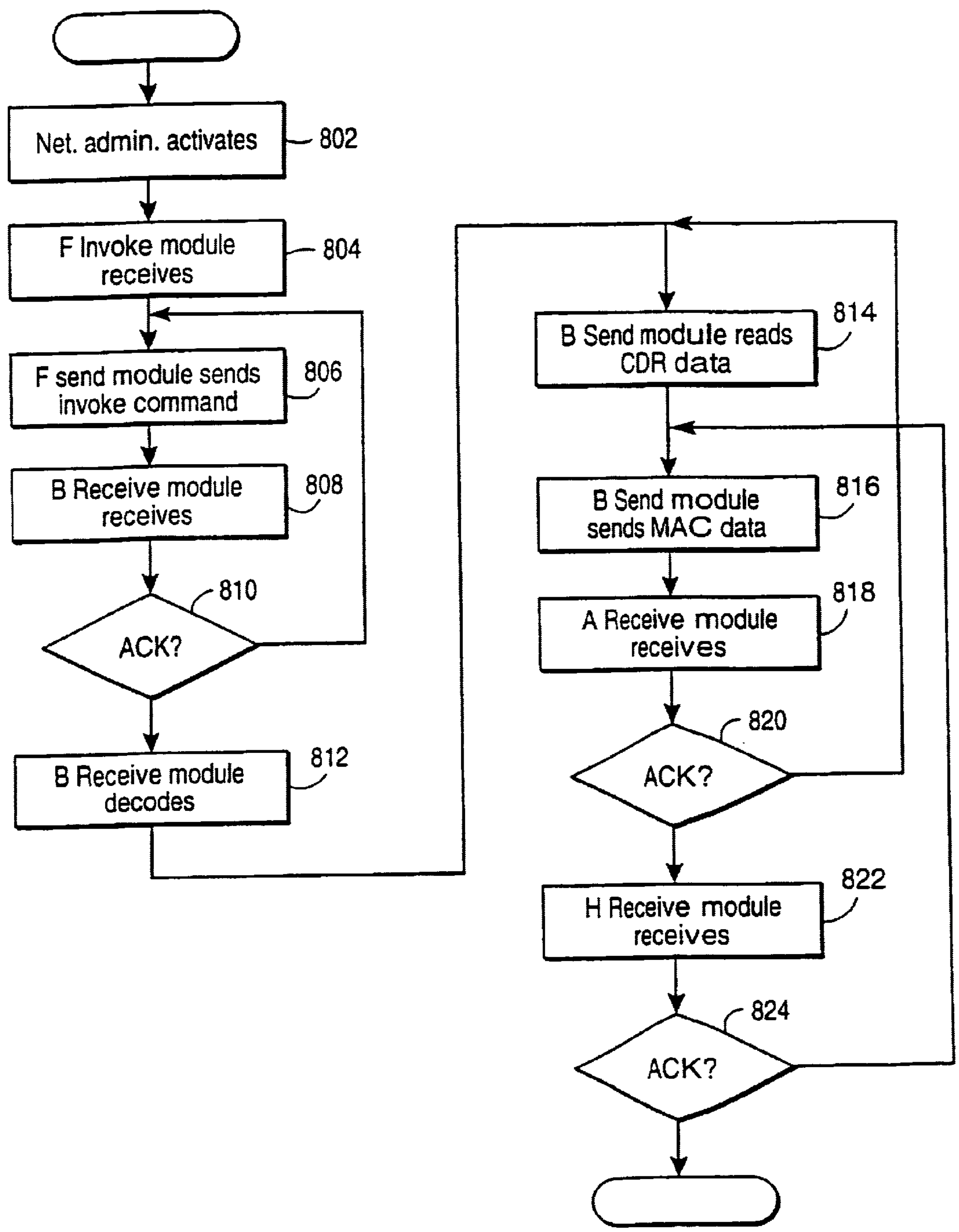

Turning now to FIG. 7B, a flowchart illustrating the method by which Server F causes Server B to send data of different types to Servers A and H respectively. In particular, in a step 802, the network administration terminal will again activate the generic transport option. In a step 804, the Server F Invoke Module will receive the activation command from the network administrator. The Server F Invoke Module will further receive the control information requiring it to send data to Server A and Server H. In a step 806, the Server F Invoke Module will send the Invoke command to the Server B Send Module. In a step 808, the Server B Send Module receives the Invoke command. As discussed above, the Invoke command includes the channel, the address of Server A and Server H, the type of data to be transmitted to Server A and Server H, and the mode of the transport. In a step 810, the Server B Send Module returns an acknowledge signal to the Server F. If, in step 810, the Server F does not receive the acknowledgement within a predetermined period, the Server F will resend the data.

In a step 812, the Server B Send Module will decode the command information received from the Server F. In a step 814, the Server B Send Module will send the CDR data to the Server A. In a step 816, the Server B Send Module will send the MAC data to the Server H. In a step 818, the Server A Receive Module will receive the CDR data from the Server B Send Module. In a step 820, the Server A Receive Module will respond to the reception of the data with an acknowledgement signal. If, in step 820, the Server B Send Module does not receive the acknowledgement within a predetermined period the Server B Send Module will resend the data.

In a step 822, the Server H Receive Module will receive the MAC data from the Server B Send Module. In a step 824, the Server H Receive Module will transmit an acknowledgement to the Server B Send Module acknowledging receipt of the MAC data. If, in step 824, the acknowledgement is not received within a predetermined period, the Server B Send Module will resend the MAC data.

Figure 7C:
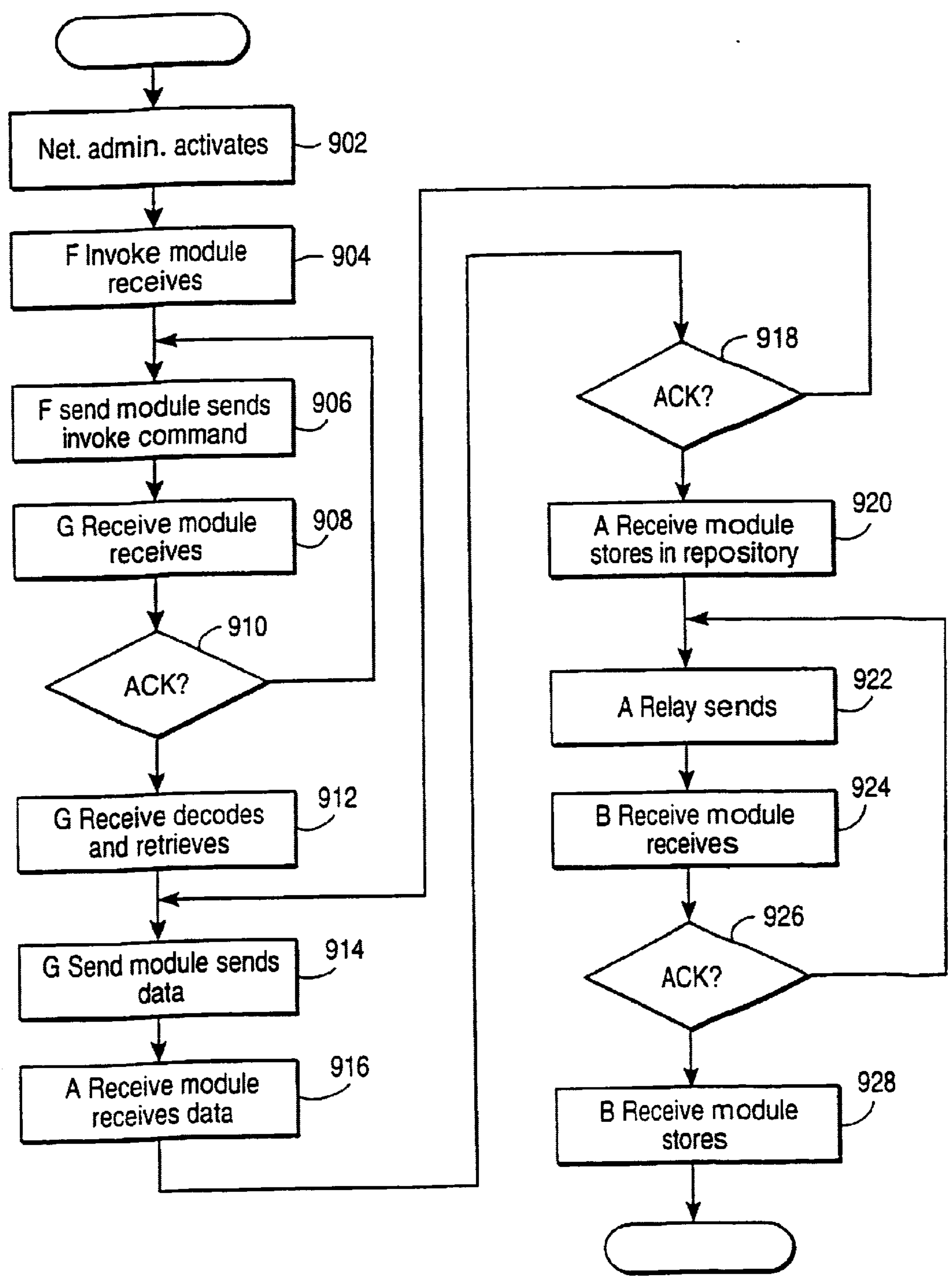

Turning now to FIG. 7C, a flowchart 900 illustrating signalling for request (3) is shown. Again in a step 902, the network administrator activates the generic transport option. In a step 904, the Server F Invoke Module receives the activation command from the network administrator. In a step 906, the Server F Invoke Module sends the Invoke request to the Server G. In a step 908, the Server G Send Module receives the Invoke request and in a step 910 transmits an acknowledgement to the Server F. If the Server F does not receive the acknowledgement within a predetermined period, the Server F Invoke Module resends the invoke request. In a step 912, the Server G Send Module retrieves the data which are to be sent to Server A and Server B. In particular, the microprocessor 112 may read the data from the memory 117. In a step 914, the Server G Send Module sends the CDR data to the Server A Receive Module. In a step 916, the Server A Receive Module receives the data and command information. In a step 918, the Server A Receive Module sends an acknowledgement command back to the Server G Send Module. If the acknowledgement is not received within a predetermined period, the Server G may resend the data. In a step 920, the Server A Receive Module may store the received data in the receive repository. In addition, the Server A Receive Module will strip the control header of the command directing transfer of data from Server G to Server A. In a step 922, the Server A Relay Module will send the data to the Server B Receive Module. In a step 924, the Server B Receive Module will receive the data. In a step 926, the Server B Receive Module will transmit an acknowledgement command to the Server A. If the acknowledgement is not received within a predetermined period, the Server A Relay Module will retransmit the data. In a step 928, the Server B Receive Module will store the data in the receive repository.

Figure 7D:
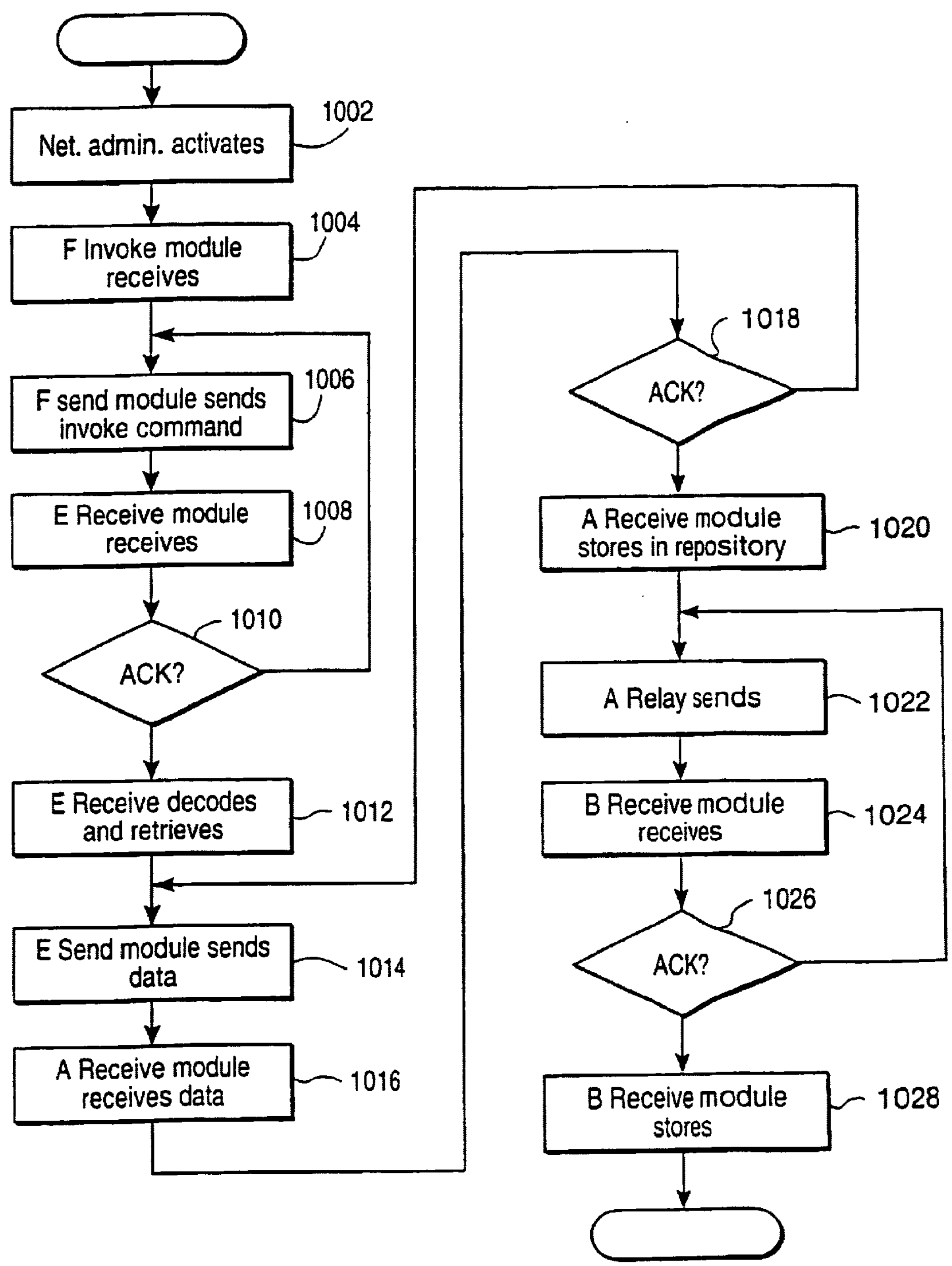

Turning now to FIG. 7D, a flowchart illustrating transmission of data from Server E to Servers A and B is shown. Again, in a step 1002, the network administrator activates the generic transport option. In a step 1004, the Server F Invoke Module receives the activation command from the network administrator. In a step 1006, the Server F Invoke Module sends the Invoke request to the Server E. In a step 1008, the Server E Send Module receives the invoke request and in a step 1010 transmits an acknowledgement to the Server F. If the Server F does not receive the acknowledgement within a predetermined period, the Server F Invoke Module resends the invoke request. In a step 1012, the Server E Send Module retrieves the data which are to be sent to Server A and Server B. In a step 1014, the Server E Send Module sends the CDR data to the Server A Receive Module. In a step 1016, the Server A Receive Module receives the data and command information. In a step 1018, the Server A Receive Module sends an acknowledgement command back to the Server E Send Module. If the acknowledgement is not received within a predetermined period, the Server E will resend the data. In a step 1018, the Server A Receive Module will store the received data in the receive repository. In a step 1022, the Server A Relay Module will send the data to the Server B Receive Module. In a step 1024, the Server B Receive Module will receive the data. In a step 1026, the Server B Receive Module will transmit an acknowledgement command to the Server A Send Module. If the acknowledgement is not received within a predetermined period, the Server A Relay Module will retransmit the data. In a step 1028, the Server B Receive Module will store the data in the receive repository.

The invention described in the above detailed description is not intended to be limited to the specific forms set for the herein, but on the contrary it is intended to cover such alternatives, modifications and equivalents as can be reasonably included within the spirit and scope of the appended claims.

What is claimed is:

1. A system for providing transport of data in a network including a first server and one or more other servers, comprising:

means for invoking said transport from said first server, said invoking means including means for determining a data type of said data to be transmitted over an ISDN channel and terminating a previous invocation if a previous invocation has been invoked for said date type;

means for responding to said invoking means by transporting data from said first server to one or more second servers over said ISDN channel, said responding means including means at said one or more second servers for relaying said data to others of said one or more second servers; and means for acknowledging reception of a command from said invoking means;

wherein said data may be sent in a batch, real-time, or mixed mode, responsive to said invoking means, wherein in said batch mode, stored data are transported according to a schedule specified by said invoking means; wherein in said real time mode, real time data are transported; and wherein in said mixed mode, stored data and real time data are transported wherein one of said batch mode, mixed mode, or real time mode continues after an invocation by said invoking means until a subsequent invocation occurs.

2. A system according to claim 1, wherein said responding means includes means for transporting said data in a broadcast mode or a relay mode.

3. A system according to claim 2, wherein said invoking means includes means for selecting an ISDN B-channel or an ISDN D-channel for said transport.

4. A system according to claim 1, said responding means including means for loading said data of a plurality of types into one or more data containers.

5. A system according to claim 4, wherein said types are not mixed within individual containers.

6. A system according to claim 1, further including means responsive to a command from said invoking means at one of said one or more second servers for transporting data from said second server to one or more third servers.

7. A system according to claim 6, wherein said invoking means includes means for providing a control header, said control header including one or more destinations for said transport.

8. A system according to claim 7, wherein said second server includes means for removing at least a portion of said control header prior to transporting said data from said second server to said third server. transport.

9. A system according to claim 7, wherein said control header is provided with every message on said ISDN-D-channel when transport is via D-channel.

10. A system according to claim 9, wherein said control header is on said ISDN B-channel when transport is via B-channel.

11. A system according to claim 10, wherein said transport occurs in a batch mode.

12. A system according to claim 11, wherein said transport occurs in a real-time mode.

13. A system according to claim 6, further including means at said one or more third servers for acknowledging reception of data.

14. A system according to claim 13, said relaying means further including means responsive to said acknowledging means for re-sending data from said second server to said one or more third servers.

15. A system according to claim 2, including means at said one or more third servers for transporting data from said one or more third servers to one or more fourth servers.

16. A system according to claim 15, further including means at said one or more fourth servers for acknowledging reception of data.

17. A system according to claim 16, further including means responsive to said acknowledging means for re-sending data from said third server to said one or more fourth servers.

18. A system for providing transport of data, comprising:

means for invoking said transport from at least one server to a plurality of servers, said invoking means including means for determining a data type of said data to be transmitted over an ISDN channel and terminating a previous invocation if a previous invocation has been invoked for said data type; and means coupled to said invoking means for transporting said data in a first mode or a second mode, said invoking means specifying which of said first or second modes is used, said second mode comprising a relay mode for relaying said data from one of said plurality of servers to others of said plurality of servers;

wherein said data may be sent in a batch, real-time, or mixed mode, responsive to said invoking means, wherein in said batch mode, stored data are transported according to a schedule specified by said invoking means; wherein in said real time mode, real time data are transported; and wherein in said mixed mode, stored data and real time data are transported wherein one of said batch mode, mixed mode, or real time mode continues after an invocation by said invoking means until a subsequent invocation occurs.

19. A system according to claim 18, wherein said second mode is a broadcast mode.

20. A system according to claim 18, wherein said invoking means includes means for selecting a transport facility.

21. A system according to claim 20, wherein said selecting means includes means for selecting between ISON transport options.

22. A system according to claim 21, wherein said selecting means is configured to select a first ISDN transport option for transport of said data from a first server to a second server and a second ISDN transport option for transport of said data from said second server to at least one other server.

23. A system according to claim 21, wherein said selecting means selects between an ISDN D-channel and an ISDN B-channel.

24. A system for providing transport of date over an ISDN channel in a network including a first server and one or more other servers, comprising:

means for invoking said transport from said first server; and means for responding to said invoking means by transporting data from said first server to one or more second servers over said ISDN channel, said responding means including means at said one or more second servers for relaying said data to others of said one or more second servers;

wherein said data may be sent in a batch, real-time, or mixed mode, responsive to said invoking means, wherein in said batch mode, stored data are transported according to a schedule specified by said invoking means; wherein in said real time mode, real time data are transported; and wherein in said mixed mode, stored data and real time data are transported wherein one of said batch mode, mixed mode, or real time mode continues after an invocation by said invoking means until a subsequent invocation occurs.

25. A system for providing transport of data over an ISDN channel in a network including a first server and one or more other servers, comprising:

means for invoking said transport from said first server; and means for responding to said invoking means by transporting data from said first server to one or more second servers, said responding means including means at said one or more second servers for relaying said data to others of said one or more second servers;

wherein said data may be sent in a batch, real-time, or mixed mode, responsive to said invoking means, wherein in said batch mode, stored data are transported according to a schedule specified by said invoking means; wherein in said real time mode, real time data are transported; and wherein in said mixed mode, stored data and real time data are transported wherein one of said batch mode, mixed mode, or real time mode continues after an invocation by said invoking means until a subsequent invocation occurs.

* * * * *